United States Patent [19]

Lehmann et al.

[11] 4,383,453

[45] May 17, 1983

[54] STEPPING MECHANISM

[75] Inventors: Hansrudolf Lehmann, Zurich; Hans Wermelinger, Rümlang, both of Switzerland

[73] Assignee: Contraves AG, Zurich, Switzerland

[21] Appl. No.: 205,755

[22] Filed: Nov. 10, 1980

[30] Foreign Application Priority Data

Dec. 19, 1979 [CH] Switzerland ........................ 11247/79
Mar. 20, 1980 [CH] Switzerland ........................ 2192/80

[51] Int. Cl.³ ................................................ F16H 27/02
[52] U.S. Cl. ........................................... 74/128; 74/160
[58] Field of Search ................. 74/128, 129, 142, 160, 74/575, 576, 577; 200/17 B, 153 LB, 156, 291, 329, 330; 335/123, 140

[56] References Cited

U.S. PATENT DOCUMENTS

| | | | |
|---|---|---|---|
| 2,153,430 | 4/1939 | Newman | 74/97 |
| 3,140,365 | 7/1964 | Voland | 200/16 |
| 3,375,337 | 3/1968 | Barrett et al. | 200/156 |
| 3,435,167 | 3/1969 | Pfleger | 200/156 |
| 3,526,149 | 9/1970 | Wollar | 74/142 |
| 3,582,594 | 6/1971 | Twyford | 200/172 |
| 3,636,782 | 1/1972 | Huber | 74/575 |
| 3,748,915 | 7/1973 | Winter et al. | 74/128 |
| 3,802,282 | 4/1974 | Cook | 74/128 |
| 3,876,848 | 4/1975 | Hartmann | 200/156 |
| 4,112,278 | 9/1978 | Greiner et al. | 200/156 |
| 4,257,283 | 3/1981 | Haller et al. | 74/128 |
| 4,270,399 | 6/1981 | Kneff | 74/578 |

FOREIGN PATENT DOCUMENTS

| | | | |
|---|---|---|---|
| 1549987 | 3/1967 | Fed. Rep. of Germany | 74/128 |
| 2160605 | 6/1973 | France . | |
| 2163956 | 7/1973 | France . | |
| 398133 | 2/1966 | Switzerland . | |

*Primary Examiner*—Lawrence J. Staab
*Attorney, Agent, or Firm*—Werner W. Kleeman

[57] ABSTRACT

A forward and rearward indexible stepping mechanism, for instance for a multi-position switch, which is arranged within a housing and has a one-piece drive which can be brought into engagement with a rotatably arranged pinion by means of a linear work movement. At the drive there is provided a flexible latching element which connects two plungers in a bridge-like fashion, so that a latching cam arrangement formed at the latching element engages at the pinion.

12 Claims, 7 Drawing Figures

STEPPING MECHANISM

CROSS-REFERENCE TO RELATED CASE

This application is related to the commonly assigned copending U.S. application Ser. No. 16,016, filed Feb. 28, 1979 entitled: "Stepping Mechanism for a Multi-Position Switch", now U.S. Pat. No. 4,257,283, granted Mar. 24, 1981.

BACKGROUND OF THE INVENTION

The present invention relates to a new and improved construction of a forwardly and rearwardly indexible stepping mechanism, for instance for a multi-position switch.

Generally speaking, the forwardly and rearwardly indexible stepping mechanism of the present development is arranged within a housing and contains a one-piece drive having two push buttons or equivalent structure each associated with a respective given indexing or switching direction, two switching elements, two plungers and a latching element. This latching element can be brought by means of a linear work movement into engagement with a pinion rotatably arranged upon a shaft or axis located at the plane of symmetry of the housing.

In German Pat. No. 2,262,274 and the corresponding U.S. Pat. No. 3,876,848 there is disclosed a stepping mechanism whose keys or feelers are formed of one-piece with the push buttons. These push buttons are connected with the keys by means of a respective resilient web rendering possible a pivoting of the entire keys in relation to the lengthwise axis.

Upon depressing a push button there is accomplished, due to the engagement of a transport pin at the character wheel, one half of an indexing step which is then completed upon sliding back of the key or feeler by a transport wedge. The movement of the character dial occurs suddenly and against the pressure direction.

In German Pat. No. 2,653,172 there is disclosed a key coding switch wherein the forward and backward switching or indexing steps are correlated to a respective key which is provided with approximately C-shaped actuation and latching cams which engage at opposite sides over a toothed rim. Upon depressing of a key the related actuation cam places the toothed rim into motion, whereas the latching cam of the other key is deflected out of its rest position by the toothed rim. Both for the fabrication and also the assembly of this structure it is disadvantageous that the drive consists of two separate parts, and additionally, there must be mounted two individual springs.

SUMMARY OF THE INVENTION

Therefore, with the foregoing in mind it is a primary object of the present invention to provide a new and improved construction of a stepping mechanism which is not associated with the aforementioned drawbacks and limitations of the prior art constructions.

Another and more specific object of the present invention aims at providing a new and improved construction of a stepping mechanism of the previously mentioned type wherein by depressing a push button or key once there can be accomplished an exact indexing step without there being required for this purpose extremely accurate manufacturing tolerances of the individual parts or any adjustment thereof.

A further object of the present invention is to provide an improved construction of stepping mechanism wherein the drive can be formed of one-piece, there is afforded simple assembly without the need to resort to additional aids and the stepping mechanism can be fabricated with conventional injection molding techniques using plastic materials.

A further object of the invention is to fulfill the foregoing objectives through the novel construction of stepping mechanism of the invention, even if such is in miniaturized configuration.

Now in order to implement these and still further objects of the invention, which will become more readily apparent as the description proceeds, the stepping mechanism of the present development is manifested by the features that there is provided a flexible latching element which interconnects in a bridge-like fashion both of the plungers, so that a latching cam arrangement symmetrically formed at the latching element with respect to the symmetry axis of the housing engages with the pinion for fixedly retaining a selector wheel in the rest position, but in the presence of each indexing step directed opposite to the restoring force of a spring releases the pinion and after completion of the indexing step engages by the action of the force of the spring at the pinion for the renewed retention of the selector disc or wheel.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
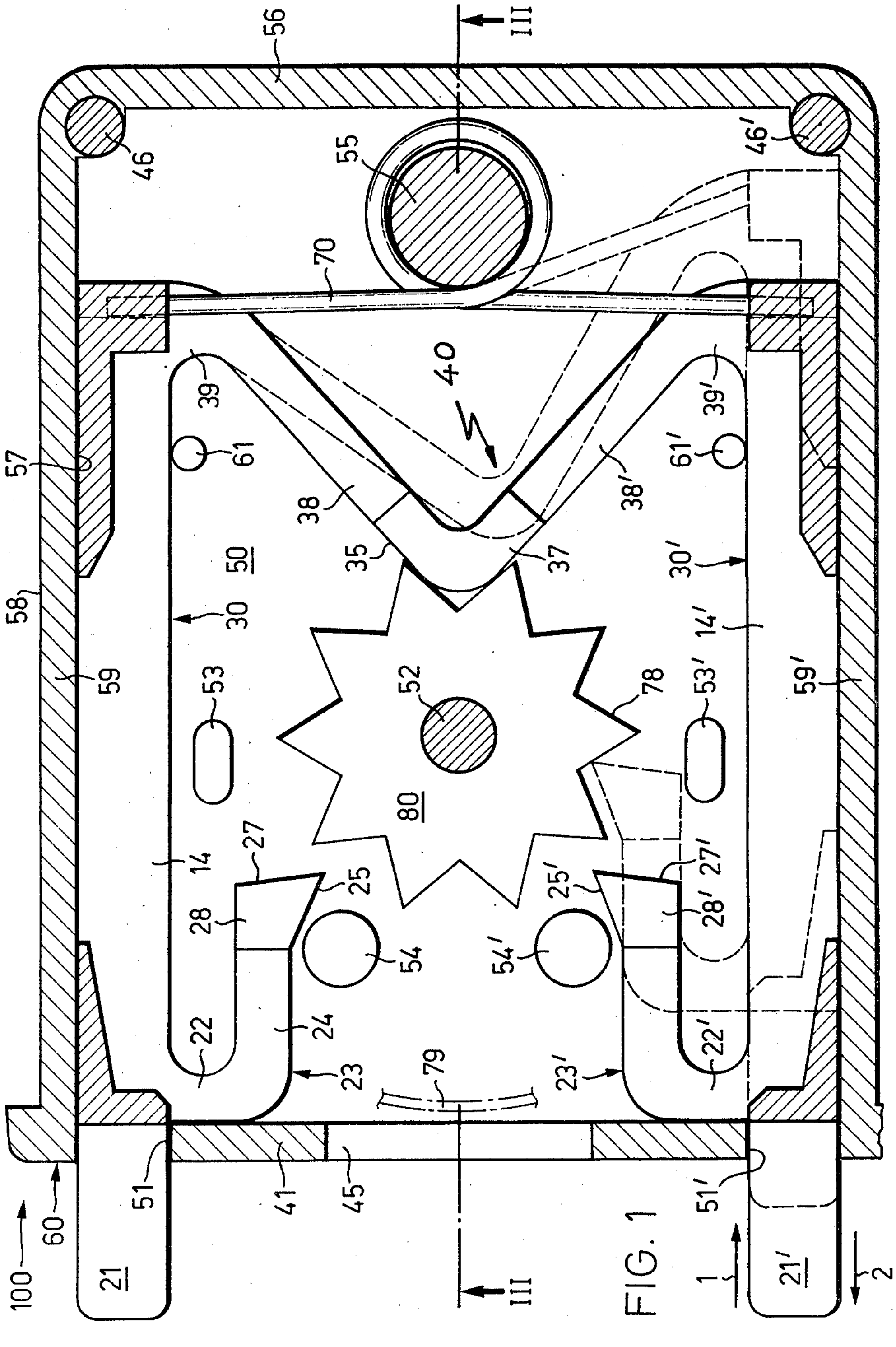
FIG. 1 illustrates on an enlarged scale and sectional front view a stepping or indexing mechanism in its rest position and after actuation of a push button or key.

Describing now the drawings, in FIG. 1 there is shown in sectional view a push-button switch 100 at which there will be recognized a housing 60 composed of a side wall 50, an end wall 41, an upper wall 59, a lower wall 59' and a rear wall 56. Arranged within the housing 60 is a forwardly and rearwardly indexible stepping mechanism essentially composed of a drive 30, a selector disc or wheel 79 with a pinion 80 attached thereto and a spring 70.

Figure 2:
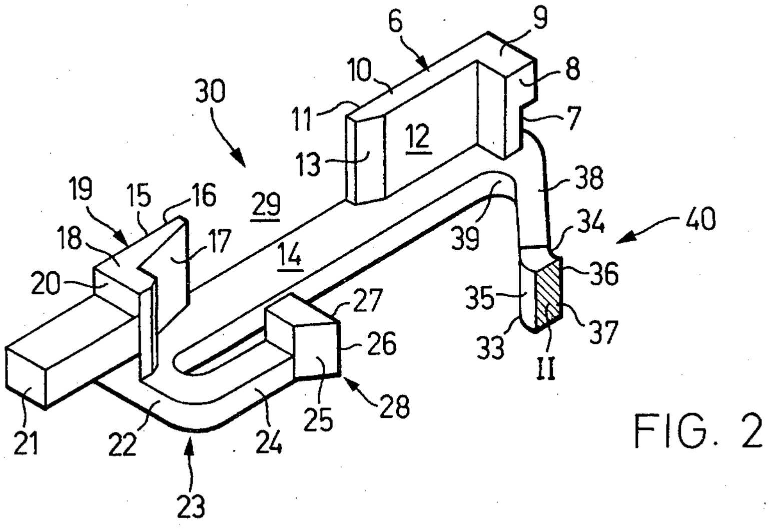
FIG. 2 is a perspective view of one of both halves of the drive according to a first embodiment and shown in mirror-symmetrical illustration with respect to the sectional plane II of such FIG. 2.

FIG. 2 shows in perspective view one of both halves of the drive 30 which is essentially mirror-symmetrical with respect to the sectional plane II. This drive 30 contains a push-button 21 or equivalent structure, a plunger 14, a switching or indexing element 23 and a latching element 40. The indexing or switching element 23 is arranged by means of a web 22 laterally at the plunger 14 and extends by means of a further, step-shaped offset switching arm 24 approximately parallel to the plunger 14.

Formed at the end of the switching arm 24 is a switching or indexing cam or dog 28 having a front surface 27 and an inner surface 25. The front surface 27 and the inner surface 25 enclose an acute angle with one another.

In order to impart additional rigidity to the switching or indexing arm 24 there is formed at both ends of the plunger 14 an angle-like corner element or piece 19 and 6, respectively. To render possible the installation of as large as possible selector disc or wheel 79 or the like the corner elements 19 and 6 are preferably separated from one another by a recess or space 29. The corner element 19 consists of an end wall 18 having an end surface 20 as well as a side wall 15 arranged essentially at right angles to the end surface 20. At the end surface 20 there is arranged the push-button 21. The side wall 18 is of essentially wedge-shaped configuration and is bounded by an outer surface 16 extending parallel to the plunger 14 and an inner surface 17 which is slightly inclined with respect to the plunger 14. The corner element 6 likewise has an inner side or face 8 extending parallel to the plunger 14, at which inner side 8 there will be seen a recess or step-like depression 7 which is provided for the purposes of retaining a spring 70, as best recognized by referring to FIG. 1. The side wall 10 possesses an outer surface 11 and an inner surface 12, both of which surfaces 11 and 12 extend essentially parallel to the plunger 14. A second inner surface 13 is inclined slightly with respect to the outer surface 11 and imparts a wedge-shaped closure configuration to the outer wall 10.

In shaped relationship from the push-button 21 there is formed at the end of the plunger 14 a substantially V-shaped latching element 40 composed of a curved or arcuate latching member 34 and the latching cam or dog 37. The curved latching member 34 consists of an essentially linear latching arm 38 and in mirror-symmetrical relationship thereto a latching arm 38' (FIG. 1) as well as in an intermediate element 33 at which there is formed the latching cam or dog 37. The angle between the latching arm 38 and the plunger 14 amounts to about 45 degrees, while the angle between the latching arm 38 and the mirror-symmetrical latching arm 38' amounts to about 90 degrees. The latching cam or dog 37 possesses a convex curved latching surface 35 and a concave curved inner surface 36 which extend essentially parallel to one another. Due to the compact construction of the curved or arcuate latching member 34 the latching element 40 can be bent with respect to the forces exerted in the direction of the arrows 1 and 2, but particularly however the connection or attachment portion 39 as well as the connection or attachment portion 39' are constructed to be bendable.

Figure 3:
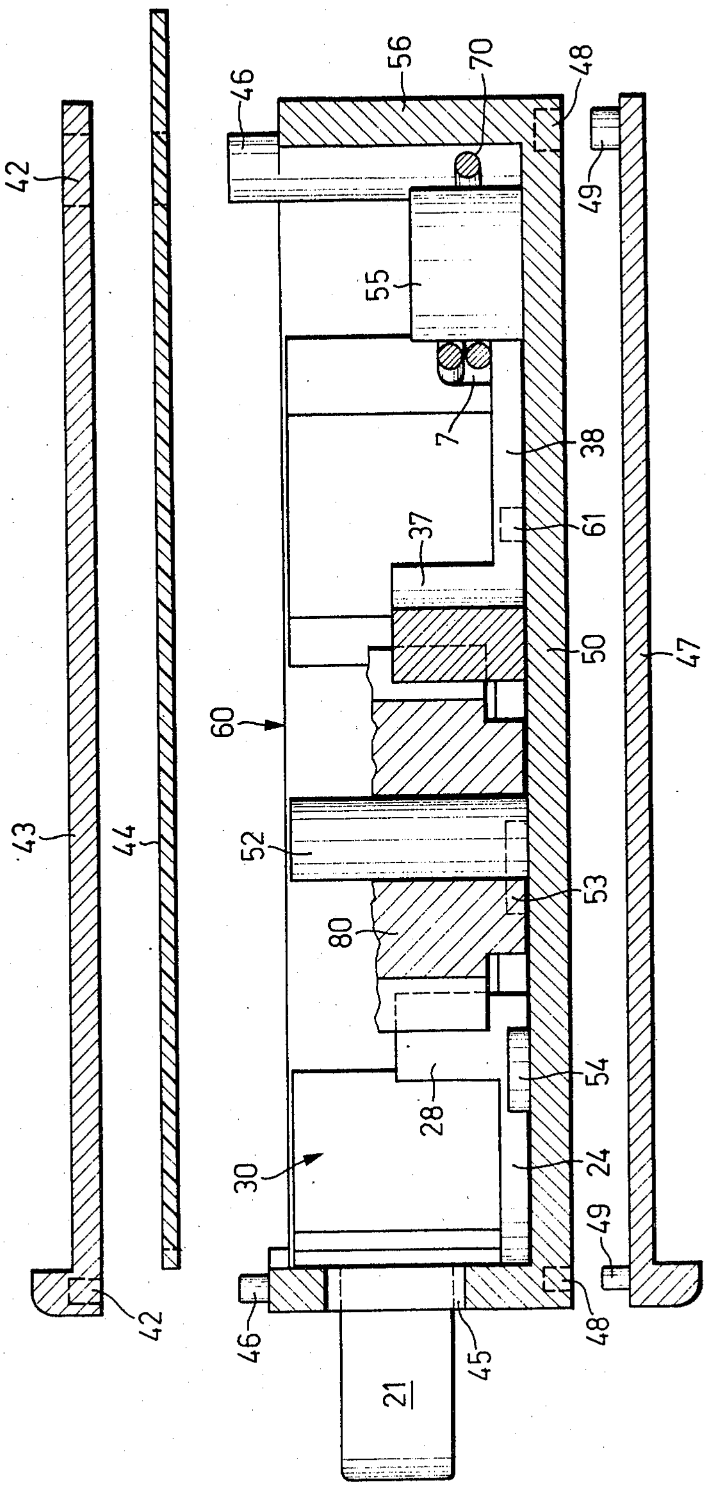
FIG. 3 is a sectional plan view of the stepping mechanism illustrated in FIG. 1, taken substantially along the line III—III thereof and showing the same in partially disassembled condition.

FIG. 3 illustrates the switch construction of FIG. 1 in sectional view, taken substantially along the section line III—III thereof. There will be recognized the housing 60 which is closed at one side by the side wall 50 and at the other oppositely situated side is structured to be open. Furthermore, there will be recognized the drive or actuation element 30 mounted within the housing 60 and also the spring 70. The open housing side is closed by a printed circuit board 44 which, for the purpose of simplifying the illustration, has been shown in spaced relationship with respect to the open housing side and by a closure plate 43 which likewise has been shown in spaced relationship from the housing 60. This housing 60 possesses in each of its corners at least one pin 46 which latch or engage in a snap button-like fashion in a bore 42 appropriately provided at the closure plate 43. The corners of the side wall 50 are each provided with a bore 48 into which latches in each case a pin or pin member 49 of a closure plate 47.

Figure 4:
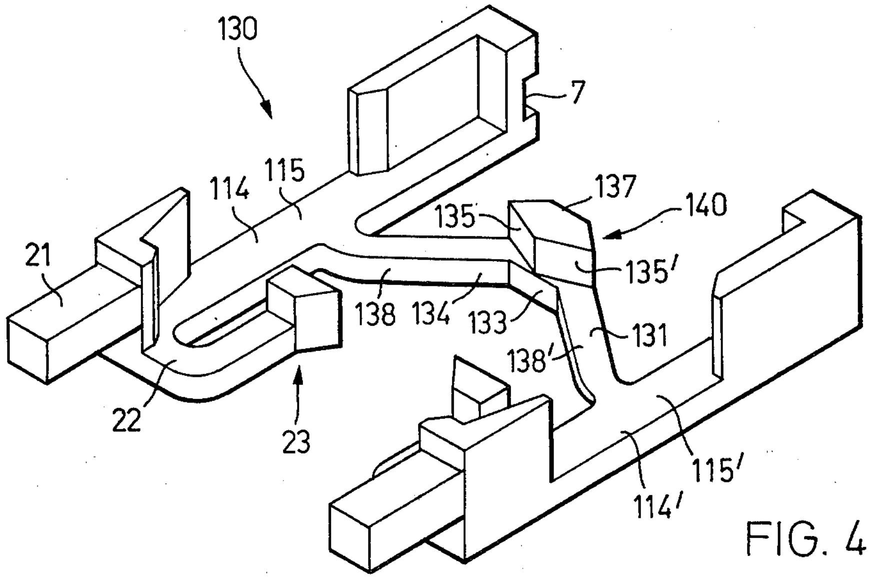
FIG. 4 is a perspective view of a second embodiment of drive of the inventive stepping mechanism.

FIG. 4 illustrates in perspective view a second embodiment of a drive which only differs from the first embodiment of drive according to FIG. 2 in the design of the latching element 140. The substantially U-shaped latching element 140 consists of a latching arc member 134 at which, as will be seen, there are provided two latching arms or arm members 138 and 138' which enclose an angle of about 90 degrees with respect to one another. At an upper side or face 131 of the latching arc member 134 there is formed or otherwise approximately provided a latching cam or dog 137 having two latching planes or surfaces 135 and 135' which enclose an acute angle with respect to one another. Each latching arm 138 and 138' encloses an angle of about 135 degrees with respect to the related half of the plunger 114 and 114', respectively, which is hingedly connected in the direction of the related push button.

Figure 5:
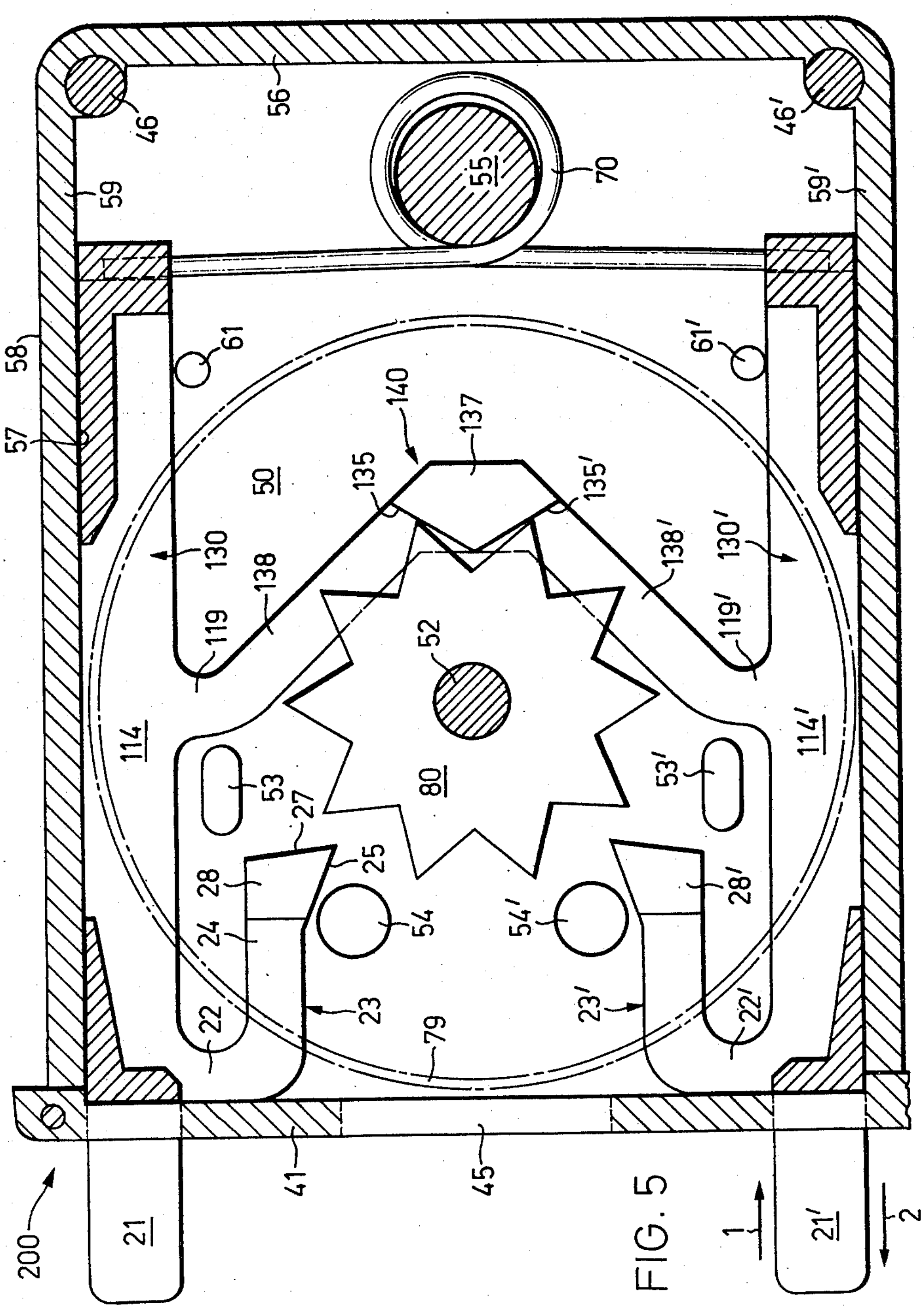
FIG. 5 illustrates in side sectional view a second embodiment of stepping mechanism according to the invention.

FIG. 5 illustrates in fragmentary view a push-button switch 200 having a drive 130 according to the second embodiment illustrated in FIG. 4. The respective plunger 114 and 114' is additionally guided by a related pin 61 and 61', respectively, fixedly connected with the side wall 50. There will be clearly recognized how in the rest position the latching surfaces 135 and 135' press against the pinion 80, due to the action of the force of the spring 70.

At this point there will be described in greater detail the mode of operation of the stepping mechanism in conjunction with the push-button switch.

As will be apparent from the previously described FIGS. 1 to 5, the forwardly and rearwardly indexible stepping mechanism which is mounted within the housing 60 selectively consists of the drive 30 of FIG. 2 or else the drive 130 of FIG. 4 as well as the character support or wheel 79 only schematically shown and in broken line illustration, this character support or wheel 79 or the like being provided with pinion 80 (FIG. 1). The end side or wall 41 of the housing 60 has a window 45 for reading the character support 79 as well as two openings 51, 51' through which there can piercingly extend and be guided therein the push buttons 21, 21' of the corresponding drive 30 or 130, as the case may be.

By actuating the push button 21' the plunger 14' is moved in the direction of the arrow 1. This plunger 14' is guided at the one side at the inner wall 59' and at the other side by the pins 61' fixedly connected with the side wall. During such time as the plunger 14' moves in the direction of the arrow 1 the drive bears, as shown in FIG. 1, under the action of spring 70 at the cam 55. During this course of movement there is simultaneously shifted the latching element 40 in the direction of the arrow 1, whereas the other actuation element does not experience any displacement. Associated therewith is a deformation of the drive which essentially occurs at the connection locations 39, 39', 119 and 119'. Due to the displacement of the plunger 14' there automatically also is shifted the latching cam 37 in the direction of the arrow 1, so that it is spaced from the pinion 80 and unlocks such pinion. Due to further actuation of the push button 21' in the direction of the arrow 1 the front surface 27' of the switching cam 28' comes into engagement with the pinion 80 and, with continued actuation, causes rotation of the selector disc 79 through an entire or complete switching operation of, for instance 36 degrees. During the actuation there is prevented any deflection of the switching element 23' by the pins 54' and 53' fixedly connected with the side wall 50. The indexing step in the direction of the arrow 1 is terminated by impact of the corner element 6' at the pin 46'. Upon releasing the push button 21' the actuation element 30' is moved in the direction of the arrow 2 by the restoring force of the spring 70, and initially the latching cam 37 engages into a tooth gap 78 and after a further movement in the same sense the inner side 25' of the switching cam 23' is deflected towards the plunger 14' by the pinion 80 which is now fixedly held by the latching cam 37, and which is rendered possible by the bendable constructed web 22'. Due to the deflection of the switching element 23' the spring 70 can further move the actuation element 30' in the direction of the arrow 2, until the switching cam 28' has jumped over the pinion 80 and again moved into the rest position.

During each switching step the pinion 80 moves against the latching surface 35 of the latching cam 37 which moves in the direction of the arrow 1. The resultant pressure appears, during the actuation operation, as a pressure point.

Due to repeated actuation of the push button the required switching steps are carried out until the character support 79 has reached the desired position which can be read at the window 45 or the like.

When using a drive 130 of the second embodiment, during each switching step, the pinion 80 moves approximately in the same direction as the latching cam 137. Since the pinion 80 cannot exert any pressure upon the latching cam 137, there does not appear any pressure point upon actuation.

The housing with the pins, stops and so forth arranged at the inner side of the side wall as well as the drive are preferably fabricated of a suitable plastic in an economical injection molding operation, so that there is ensured for a rational mass production and thus also lower fabrication costs.

Figure 6:
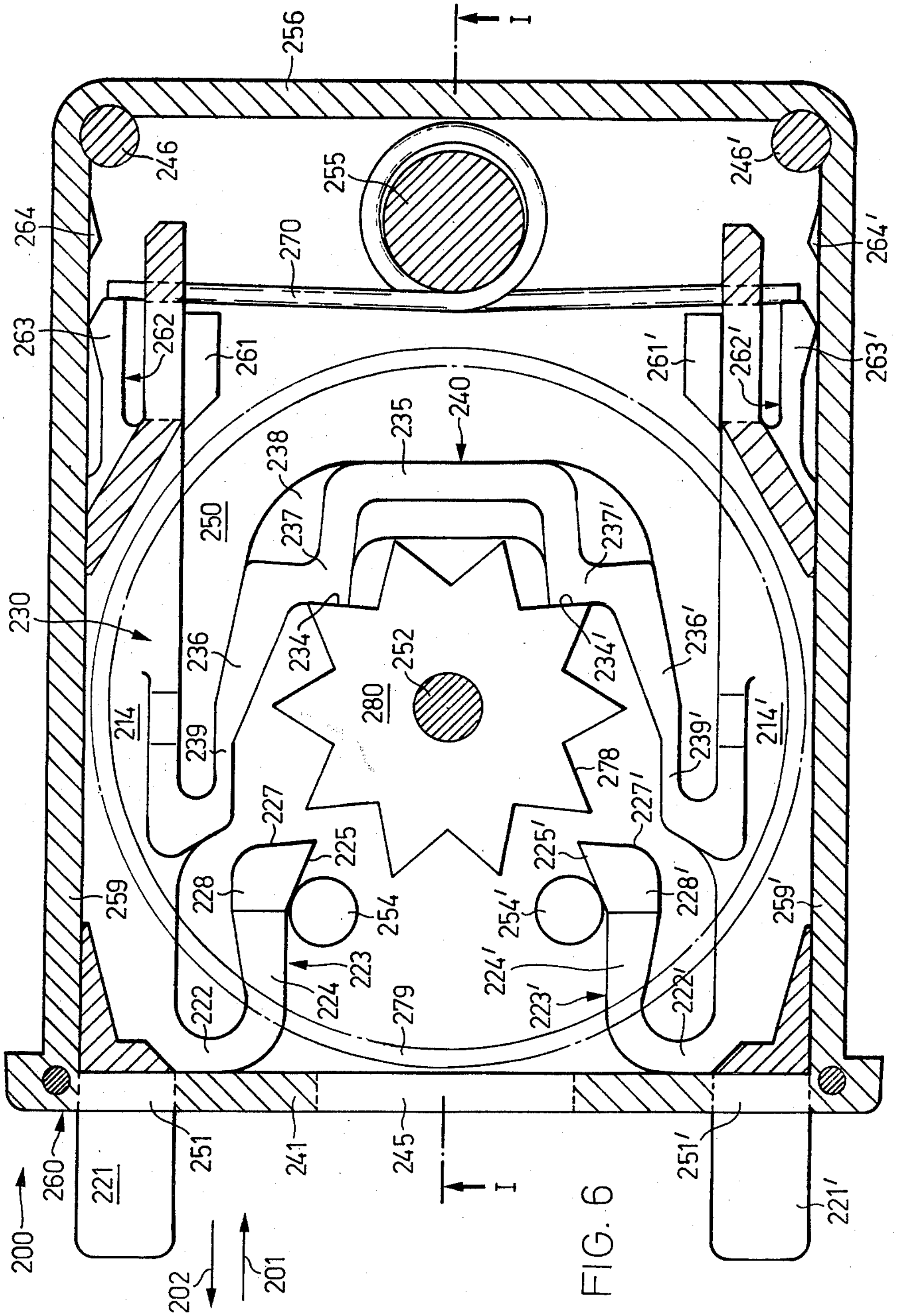
FIG. 6 is an enlarged view and a sectional showing of a stepping mechanism in its rest condition and after actuation of a push button and constructed according to a third embodiment of the invention.

In the description to follow there will be explained the invention of a third embodiment based upon the drawings. Turning attention now to FIG. 6 there is shown in sectional view a push-button switch 200 wherein there will be recognized a housing 260. This housing 260 comprises a side wall 250, an end wall 241, a lower wall 259' and an upper wall 259, and a rear wall 256. In the housing 260 there is arranged a forwardly and rearwardly indexible stepping mechanism essentially composed of a drive 230, a selector disc 279 to which there is attached the pinion 280 as well as a spring 270.

Figure 7:
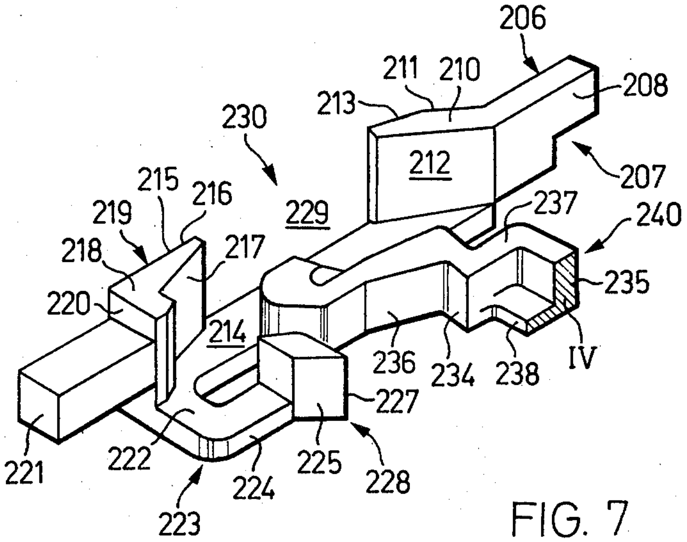
FIG. 7 is a perspective view of one of both halves of the drive according to the third embodiment of the inventive stepping mechanism of FIG. 6 and which is mirror-symmetrical with respect to the section plane IV of such FIG. 7.

In FIG. 7 there is shown in perspective view one of both halves of the drive 230 which is mirror-symmetrical with respect to the sectional plane IV. The drive 230 essentially contains a push button 221, a plunger 214, a switching or index element 223 and a latching element 240. The switching element 223 is connected laterally by means of a web 222 at the plunger 214 and extends by means of a further, step-shaped offset switching arm 224 approximately parallel to the plunger 214.

Formed at the end of the switching arm 224 is a switching cam 228 having a front surface 227 as well as an inner surface 225. The front surface 227 and the inner surface 225 enclose an acute angle with one another.

In order to impart additional rigidity to the switching arm there is formed at both ends of the plunger 214 an angle-shaped corner element 219 and 206, respectively. In order to be able to install as large as possible size selector disc 279 the corner elements 219 and 206 are preferably separated from one another by a recess 229. The corner element 219 consists of an end wall 218 having an end surface 220 as well as a side wall 215 arranged at right angles thereto. At the end surface 220 there is arranged a push button 221. The side wall is constructed to be wedge-shaped and is bounded by an outer surface 216 extending essentially parallel to the plunger 214 and an inner surface 217 which is inclined slightly thereto. The angled corner element 206 likewise possesses an inner surface or side 208 extending parallel to the plunger 214, at which inner side 208 there is provided a recess 207 for the purpose of retaining the spring 270 (FIG. 6). The side wall 210 possesses an outer surface 211 and an inner surface 212, both of which extend at an inclination of about 30 degrees with respect to the plunger 214. A second outer surface 213 is inclined slightly with respect to the outer surface 211 and imparts a wedge-shaped closure to the outer wall 210.

There is formed in spaced relationship from the push button 221 approximately at the center of the plunger 214 the substantially U-shaped latching element 240 only half of which is here shown. The half of the latching element 240 which is mirror-symmetrical with respect to the section plane IV consists of a likewise U-shaped latching arc member 235 which is reinforced by a base plate 238, and a latching cam 237 which is formed at the latching arc member 235. This latching cam or dog 237 possesses a latching surface 234 disposed essentially perpendicular to the sectional plane IV. The latching arm 236 which extends essentially parallel to the plunger 214 interconnects the latching cam 237 with this plunger 214. The latching arm 236 is provided at the region of the plunger 214 with an elastic attachment location or connection means 239 (FIG. 6). The mode of operation of the stepping mechanism and the push-button switch according to the third embodiment will be described hereinafter.

As will be apparent from the previously described figures the forwardly and rearwardly indexible stepping mechanism which is mounted in the housing 260 consists of a drive 230 according to the showing of FIG. 7 and the character support 279 which has only been shown schematically and in phantom lines. The character support is provided with a pinion 280 (FIG. 6) rotatably arranged about the pivot shaft or journal 252. The end side 241 of the housing 260 is provided with a window 245 for reading the character carrier or support 279 as well as two openings 251, 251' through which there may be piercingly extended and guided the push buttons 221, 221' of the drive or actuator 230.

By actuating the push button 221 the plunger 214 moves in the direction of the arrow 201. This plunger 214 is guided at the one side at the inner wall 259 and at the other side by a guide arrangement or bracket 261 fixedly connected with the side wall 250. During such movement of the plunger 214 in the direction of the arrow 201 the drive is supported by the action of the spring 270 at the cam 255 (FIG. 6). During this course of the movement the latching element 240 is simultaneously displaced in the direction of such arrow, whereas the other plunger 214' essentially does not experience any displacement. Associated therewith is a deformation of the drive which essentially is accomplished at the attachment locations 239 and 239'. Due to the displacement of the plunger 214 also the latching cams 237 and 237' automatically shift in the direction of the arrow 201, and they distance themselves from the pinion 280 and such pinion therefore is unlocked. Due to the further actuation of the push button 221 in the direction of the arrow 201 the front surface 227 of the switching cam 228 comes into engagement with the pinion 280 and during continued actuation causes a rotation of the selector disc 279 through a complete switching operation of, for instance, 36 degrees. During the actuation there is prevented a deflection of the switching element 223 by the pin 254 fixedly connected with the side wall 250. The switching step in the direction of the arrow 201 is terminated by impact of the corner element 206 at the pin 246.

Upon release of the push button 221, by the action of the restoring force of the spring 270, the actuation element 230 is moved in the direction of the arrow 202, and initially the latching cam 237' engages into a toothed gap or space 278 and after a further equal sense movement the second latching cam 237 engages into a toothed gap or space. The pinion 280 which is now fixedly retained by the latching cam 237' deflects the switching element 223 which moves further in the direction of the arrow towards the plunger 214, which is rendered possible by the bendable or flexible constructed web 222. Due to the deflection of the switching element 223 the spring 270 of the actuation element 230 can move further in the direction of the arrow 202, until the switching cam 228 has jumped over the pinion 280 and again moves into its rest position. In the rest position both of the latching cams 237, 237' press by means of their latching surfaces 236, 236', due to the action of the force of the spring 270, against the pinion 280 which thus is fixed in its position. By repeated actuation of the push button the momentary required switching or indexing steps are carried out, until the character carrier or support 79 has reached the desired position which can be easily read at the window 245.

The housing with the pins, stops and so forth arranged at the inner side of the side wall as well as the drive are preferably fabricated from a suitable plastics material while employing an economical injection molding operation, so that there is possible rotational mass production and therefore also there is ensured for low fabrication costs.

To render discernible the pressure point during each switching step there is formed at each plunger 214 and 214', respectively, in spaced relationship from the corresponding push button 221 and 221', respectively, a respective bending elastic projection 262 and 262', respectively. At each projection there is also formed a wedge-shaped cam 263 and 263', respectively, directed towards the side wall 259 and 259', respectively. During each switching step one of both cams 263 and 263' slides over a cam 264 and 264' formed at the housing wall 259 and 259'. The thus forced deflection of the projection 262 and 262' constitutes for the switch a pressure point.

While there are shown and described present preferred embodiments of the invention, it is to be distinctly understood that the invention is not limited thereto but may be otherwise variously embodied and practiced within the scope of the following claims. Accordingly,

What we claim is:

1. A forwardly and rearwardly indexible stepping mechanism, especially for a multi-position switch, comprising:
- a housing within which there is arranged said stepping mechanism;
- a drive provided for said stepping mechanism;
- said drive being provided with two push buttons each operatively correlated with a respective switching direction;
- said drive further containing two switching elements, two plungers and a latching element;
- a rotatably arranged pinion with which there can be brought into engagement said latching element by a linear work movement;
- said pinion being rotatably mounted upon a shaft located essentially at a plane of symmetry of said housing;
- a latching cam arrangement provided for said latching element;
- said latching cam arrangement being symmetrically arranged with respect to said plane of symmetry of said housing;
- a selector wheel operatively associated with said pinion;
- a spring coacting with said drive; and
- said latching element comprising a bendable latching element which interconnects in a bridge-like fashion both of said plungers, so that said latching cam arrangement in a rest position engages at the pinion for fixedly retaining said selector wheel, but during each complete switching step directed against a restoring force of said spring fully releases the pinion and only after completion of the complete switching step again engages by the action of the force of the spring at the pinion for the renewed fixed retention of the selector wheel.

2. A forwardly and rearwardly indexible stepping mechanism, especially for a multi-position switch, comprising:
- a housing within which there is arranged said stepping mechanism;
- a drive provided for said stepping mechanism;
- said drive being provided with two push buttons each operatively correlated with a respective switching direction;
- said dirve further containing two switching elements, two plungers and a latching element;
- a rotatably arranged pinion with which there can be brought into engagement said latching element by a linear work movement;
- said pinion being rotatably mounted upon a shaft located essentially at a plane of symmetry of said housing;
- a latching cam arrangement provided for said latching element;
- said latching cam arrangement being symmetrically arranged with respect to said plane of symmetry of said housing;

a selector wheel operatively associated with said pinion;

a spring coacting with said drive;

said latching element comprising a bendable latching element which interconnects in a bridge-like fashion both of said plungers, so that said latching cam arrangement in a rest position engages at the pinion for fixedly retaining said selector wheel, but during each switching step directed against a restoring force of said spring releases the pinion and after completion of the switching step engages by the action of the force of the spring at the pinion for the renewed fixed retention of the selector wheel; and said two plungers being constructed such that during the entire switching operation, upon actuation of one of the plungers, the other plunger is stationary.

3. A forwardly and rearwardly indexible stepping mechanism, especially for a multi-position switch, comprising:

a housing within which there is arranged said stepping mechanism;

a drive provided for said stepping mechanism;

said drive being provided with two push buttons each operatively correlated with a respective switching direction;

said drive further containing two switching elements, two plungers and a latching element;

a rotatably arranged pinion with which there can be brought into engagement said latching element by a linear work movement;

said pinion being rotatably mounted upon a shaft located essentially at a plane of symmetry of said housing;

a latching cam arrangement provided for said latching element;

said latching cam arrangement being symmetrically arranged with respect to said plane of symmetry of said housing;

a selector wheel operatively associated with said pinion;

a spring coacting with said drive;

said latching element comprising a bendable latching element which interconnects in a bridge-like fashion both of said plungers, so that said latching cam arrangement in a rest position engages at the pinion for fixedly retaining said selector wheel, but during each switching step directed against a restoring force of said spring releases the pinion and after completion of the switching step engages by the action of the force of the spring at the pinion for the renewed fixed retention of the selector wheel;

a respective web for connecting each switching element at a respective one of the plungers; and each switching element being constructed as a deflectible switching arm which extends essentially parallel to the related plunger.

4. The stepping mechanism as defined in claim 3, wherein:

both of said webs are of resilient construction.

5. A forwardly and rearwardly indexible stepping mechanism, especially for a multi-position switch, comprising:

a housing within which there is arranged said stepping mechanism;

a drive provided for said stepping mechanism;

said drive being provided with two push buttons each operatively correlated with a respective switching direction;

said drive further containing two switching elements, two plungers and a latching element;

a rotatably arranged pinion with which there can be brought into engagement said latching element by a linear work movement;

said pinion being rotatably mounted upon a shaft located essentially at a plane of symmetry of said housing;

a latching cam arrangement provided for said latching element;

said latching cam arrangement being symmetrically arranged with respect to said plane of symmetry of said housing;

a selector wheel operatively associated with said pinion;

a spring coacting with said drive;

said latching element comprising a bendable latching element which interconnects in a bridge-like fashion both of said plungers, so that said latching cam arrangement in a rest position engages at the pinion for fixedly retaining said selector wheel, but during each switching step directed against a restoring force of said spring releases the pinion and after completion of the switching step engages by the action of the force of the spring at the pinion for the renewed fixed retention of the selector wheel;

said latching element possesses a substantially V-shaped configuration; and said latching cam arrangement comprises a latching cam formed at a central portion of the latching element.

6. The stepping mechanism as defined in claim 5, wherein:

a respective one of two latching arms of the latching element is formed at a respective attachment location of the related plunger in spaced relationship from the related push button;

each latching arm together with its thereat formed plunger encloses an angle of about 45 degrees; and both of the latching arms enclose an angle of about 90 degrees with respect to one another.

7. A forwardly and rearwardly indexible stepping mechanism, especially for a multi-position switch, comprising:

a housing within which there is arranged said stepping mechanism;

a drive provided for said stepping mechanism;

said drive being provided with two push buttons each operatively correlated with a respective switching direction;

said drive further containing two switching elements, two plungers and a latching element;

a rotatably arranged pinion with which there can be brought into engagement said latching element by a linear work movement;

said pinion being rotatably mounted upon a shaft located essentially at a plane of symmetry of said housing;

a latching cam arrangement provided for said latching element;

said latching cam arrangement being symmetrically arranged with respect to said plane of symmetry of said housing;

a selector wheel operatively associated with said pinion;

a spring coacting with said drive;

said latching element comprising a bendable latching element which interconnects in a bridge-like fashion both of said plungers, so that said latching cam arrangement in a rest position engages at the pinion for fixedly retaining said selector wheel, but during each switching step directed against a restoring force of said spring releases the pinion and after completion of the switching step engages by the action of the force of the spring at the pinion for the renewed fixed retention of the selector wheel;

a respective one of two latching arms of the latching element is formed at a central portion of the related plunger and hingedly connected with such related plunger;

each latching arm encloses with respect to related plunger an angle of about 135 degrees; and both of the latching arms enclose an angle of about 90 degrees with respect to one another.

8. The stepping mechanism as defined in claim 7, wherein:

the latching element possesses a substantial V-shaped configuration; and the latching cam arrangement comprises a latching cam formed at a central portion of the latching element.

9. A forwardly and rearwardly indexible stepping mechanism, especially for a multi-position switch, comprising:

a housing within which there is arranged said stepping mechanism;

a drive provided for said stepping mechanism;

said drive being provided with two push buttons each operatively correlated with a respective switching direction;

said drive further containing two switching elements, two plungers and a latching element;

a rotatably arranged pinion with which there can be brought into engagement said latching element by a linear work movement;

said pinion being rotatably mounted upon a shaft located essentially at a plane of symmetry of said housing;

a latching cam arrangement provided for said latching element;

said latching cam arrangement being symmetrically arranged with respect to said plane of symmetry of said housing;

a selector wheel operatively associated with said pinion;

a spring coacting with said drive;

said latching element comprising a bendable latching element which interconnects in a bridge-like fashion both of said plungers, so that said latching cam arrangement in a rest position engages at the pinion for fixedly retaining said selector wheel, but during each switching step directed against a restoring force of said spring releases the pinion and after completion of the switching step engages by the action of the force of the spring at the pinion for the renewed fixed retention of the selector wheel;

said latching cam arrangement comprises two latching cams arranged substantially symmetrically with respect to said plane of symmetry; and said latching element comprises a substantially U-shaped latching element which connects in said bridge-like fashion both of the plungers with one another, so that said two latching cams in the rest position engage at said pinion for retaining the selector wheel, but during each switching step directed opposite to the restoring force of said spring release the pinion and after completion of the switching step engage by the force of the spring at the pinion for the renewed fixed retention of the selector disc.

10. The stepping mechanism as defined in claim 1, wherein:

the selector wheel moves at the region of the actuated plunger in a pressure direction of the actuated push button; and the selector wheel possessing a direction of rotation corresponding to the pressure direction of the actuated push button.

11. The stepping mechanism as defined in claim 9, wherein:

the latching element possesses two bending elastic attachment locations.

12. The stepping mechanism as defined in claim 9, further including:

a bending elastic projection means having a substantially wedge-shaped cam formed in spaced relationship from the push button at the end of the related plunger; and said projection means sliding, upon actuation of the plunger, over a cam formed at a side wall of the housing.

* * * * *